Aug. 5, 1930. A. J. TOWNSEND 1,772,118
LOCOMOTIVE AND METHOD OF OPERATION
Filed May 7, 1925 3 Sheets-Sheet 3
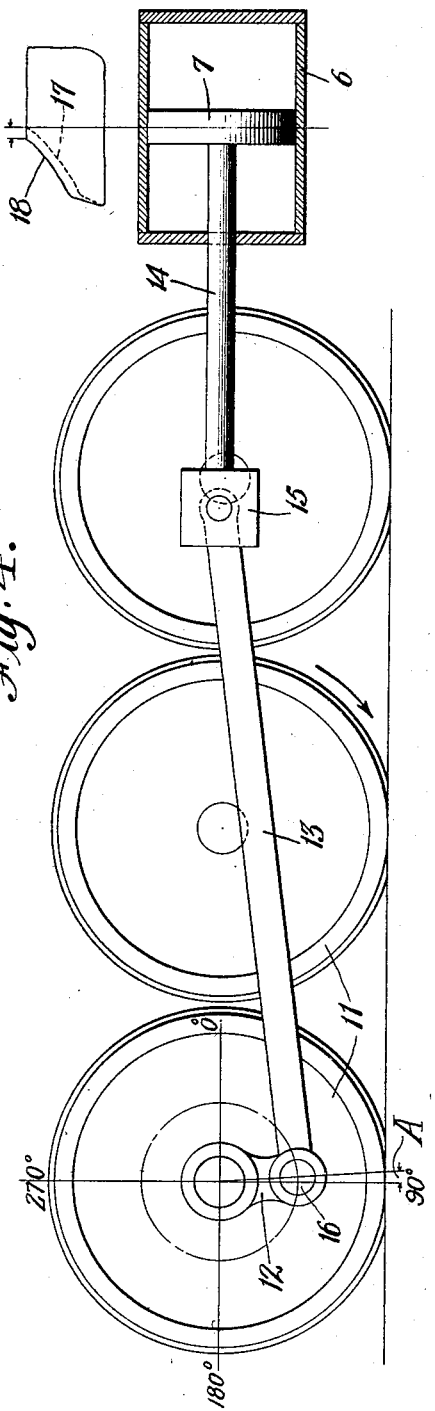
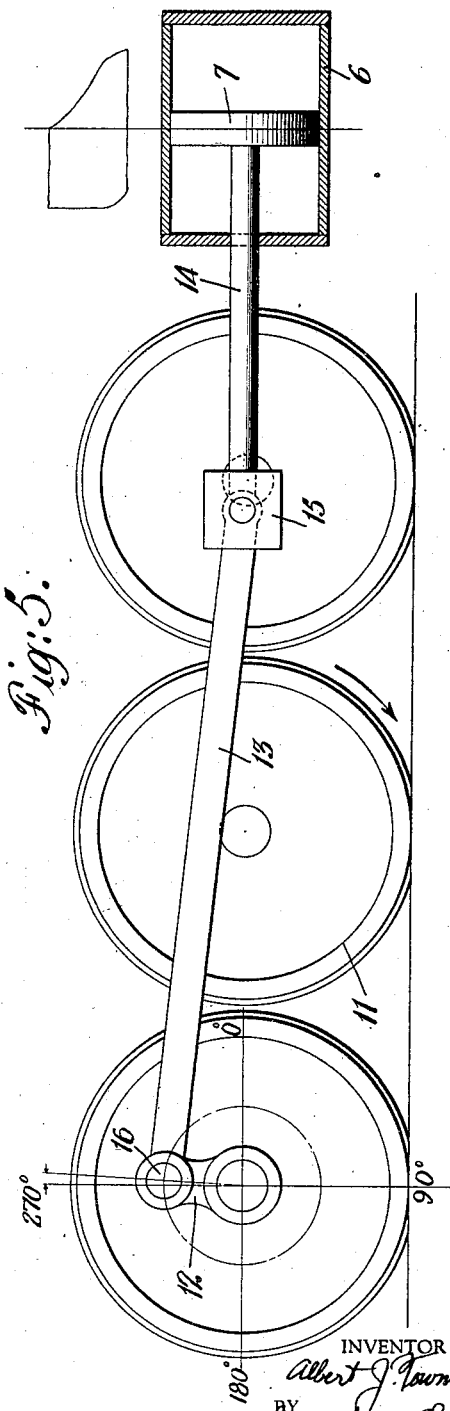

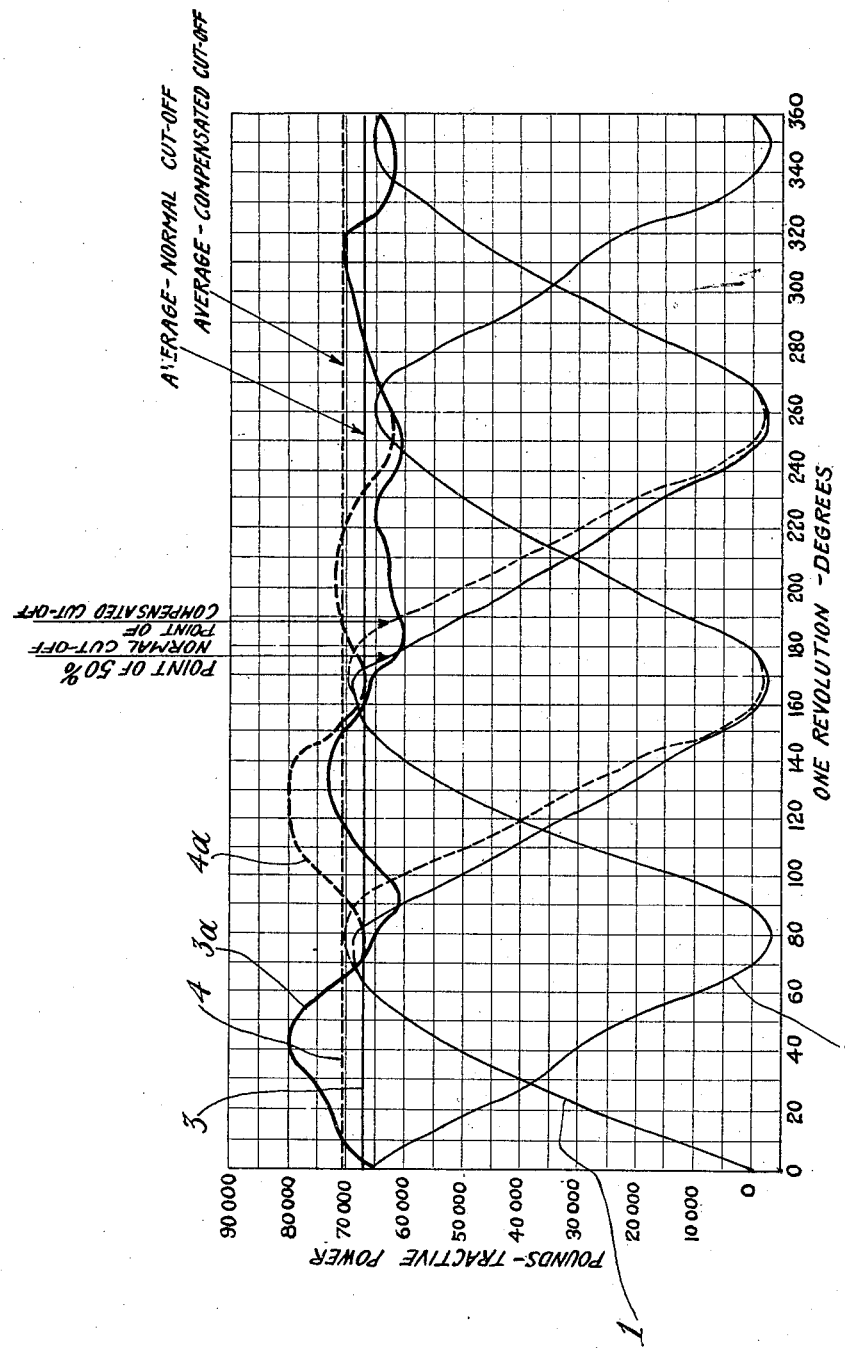

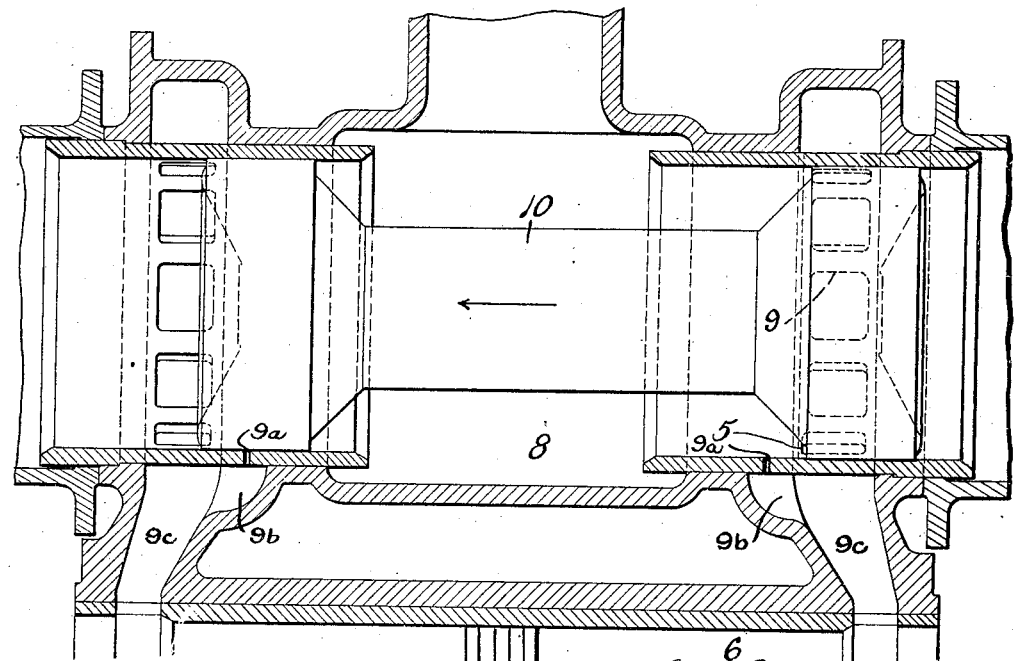
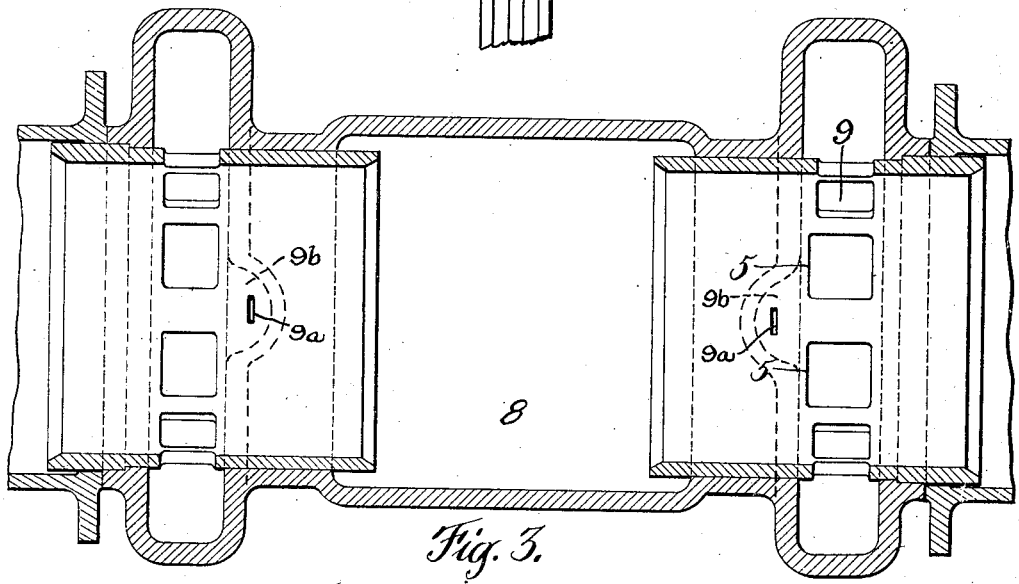

Patented Aug. 5, 1930

1,772,118

UNITED STATES PATENT OFFICE

ALBERT J. TOWNSEND, OF LIMA, OHIO

LOCOMOTIVE AND METHOD OF OPERATION

Application filed May 7, 1925. Serial No. 28,610.

The first of the objects of my present invention is to raise the average tractive power of a locomotive by such change in the valvular devices of the locomotive as will alter the torque diagram on the driving wheels at the point of the torque curve where under normal conditions the torque diagram gives a smaller tractive power than the peak. By my invention I produce a greater average tractive force than can be obtained with the usual construction of locomotive cylinders without the necessity of increasing the adhesive weight on the driving wheels.

The maximum tractive force which a locomotive can develop is limited by the adhesive weight on its driving wheels because, regardless of the power of the engine, a locomotive cannot exert a greater tractive force than that which is required to make the driving wheels slip upon the track.

My invention is particularly applicable to engines designed to operate at what is called limited cut-off as it is with engines of this special class that the most increase in tractive power may be obtained.

In any locomotive, for which the motive power is a double acting reciprocating engine, the tractive force which each cylinder produces is necessarily a variable quantity. Thus when the piston is at the end of its stroke, commonly called the "dead center", there is obviously no tractive force being produced by that cylinder. As the piston moves, however, along its stroke to the opposite dead center, that is through a half revolution of the driving wheel, a tractive force is produced which increases to the maximum amount at some point between the two dead centers and then decreases as the piston approaches the opposite dead center. At any given point during the stroke the tractive force exerted at the rim of the driving wheel is directly dependent upon the angle which the connecting rod makes with the axis of the cylinder, and upon the total effective thrust upon the piston at that instant. The total tractive force exerted by the locomotive is of course equal to the combined tractive forces produced by all of the cylinders. It is also to be observed that the total effective thrust on the piston at any time is equal to the difference in loads on each side of the piston caused by the steam pressure in the cylinder.

In the usual design of locomotive cylinders, steam is admitted at about the beginning of the stroke and continues until the valve closes the steam port after which the steam expands until it is released through the exhaust port. It has heretofore been the custom to make this point of cut-off as nearly as possible at the same point of the stroke for both ends of the cylinders. This provides a suitable valve operating gear which can be graduated equally at all the various points throughout the stroke.

In carrying out my invention I accomplish the results desired by providing a certain amount of portage at the head end of each cylinder which has a later cut-off than the portage at the crank end. As will appear from further description of the detailed disclosure accompanying this application the result of this will be to raise the average tractive power.

In the application which I have made of my invention I have made use of an ordinary valve motion and piston valve but have altered the port arrangement at the head end of each valve chest so as to give a longer admission of steam through certain ports known as compensating ports than is provided through the regular admission ports.

It will be evident that the effect of the introduction of these compensating ports will be greatest at slow speeds and that as the speed of the engine increases such effect becomes less marked so that the indicator cards on the two ends of the cylinders will become practically alike for high speed action.

In order that my invention may be better understood, I will now proceed to describe the same in connection with the accompanying drawings, wherein—

Fig. 1 is a diagram developed from a card taken from a locomotive having my invention applied thereto;

Fig. 2 is a sectional view of the valve and valve chest showing the port arrangement, and the upper portion of the cylinder and piston;

Fig. 3 is a sectional view with the valve removed, and

Figs. 4 and 5 are diagrams of the right hand side of the engine showing, respectively, the backward and forward strokes of the piston and the effect of the angularity of the main rod on the position of the crank pin when the piston is at the center of its stroke, together with an indicator card for each stroke showing the steam pressure in the cylinder.

In the card shown in Fig. 1 the line marked 1 is the diagram for the right-hand cylinder while the line marked 2 is the diagram for the left-hand cylinder.

The card shows one revolution, that is 360° and a scale of tractive power in pounds at the left-hand vertical column.

The horizontal full line 3 shows the average of the normal cut-off arrangement while the horizontal dotted line 4 shows the average of the compensated cut-off arrangement with my invention applied to the locomotive, the gain in tractive force in the instance cited being substantially 3000 pounds.

The diagram shown is for an ordinary two-cylinder limited cut-off locomotive and in connection with the curves plotted for both the right and left cylinders I have indicated the combined tractive forces. It will be understood, of course, that in limited cut-off locomotives, particularly of very early maximum cut-off (as, for example, 50% or 60%) some starting means is necessarily provided, and I have indicated in Figs. 2 and 3 what are commonly known as auxiliary ports, for starting, (indicated at $9^a$, $9^a$) which are usually positioned to deliver steam, at substantially later cut-off than the main ports, through cavities $9^b$, $9^b$, into the main steam passages $9^c$, $9^c$, to the cylinder. The purpose, positioning and operation of these ports $9^a$ being well known in the art, and usual to a 50% maximum cut-off locomotive such as I have disclosed, I will not here describe them further, since they are not, per se, a part of my invention. Suffice it to say that they are not to be confused with the present invention, which I have termed a compensating port, and which is incapable of serving as a starting means.

I have shown my improvement as applied to an engine having cut-off at approximately 50% of the stroke which is about the usual condition for that type of engine and the combined forces curve indicates the variations in total tractive force which are developed during one revolution of the engine.

The average of all the variations is, of course, the average tractive force developed and it is evident that the variations will reach different maximum amounts as shown by the line $3^a$. It is also evident that in order that the tractive force be utilized without excessive slipping of the driving wheels it is necessary to provide sufficient adhesive weight to prevent slipping at the maximum amount of tractive force and this weight will then, of course, be more than sufficient for all the lesser values. It is also evident that since this adhesive weight is practically constant on any particular locomotive, the design must be such that the wheels will not slip with the highest variation of tractive force if the locomotive is to utilize all the power which the cylinders are capable of giving to the driving wheels.

By my invention those variations in the combined tractive force curve throughout the revolution which are less than the maximum are raised to a greater value without exceeding the maximum peak of the original curve by which it is evident I am able to increase the average tractive force of the locomotive. This is shown by line $4^a$.

In carrying out my invention I admit steam to the head end of each cylinder beyond the point of normal cut-off and thereby increase the pressure during the expansion of the steam as a result of which the head end of the cylinder exerts a greater piston thrust during the period from the normal cut-off to the exhaust than does the crank end of the cylinder a fact which is indicated by the diagram in Fig. 1.

It is due to the combination of these unequal forces that there is in my invention a tendency to increase the total tractive force of the locomotive at the periods of the revolution where the tractive force is normally reduced by the inherent effect of the angularity of the main rod on the position of the crank pin. This is brought out clearly in the diagram of Fig. 1 in which the full lines represent the normal limited cut-off locomotive and the dotted lines the compensated cut-off locomotive which embodies my improvement.

In carrying out my invention I employ a conventional design of cylinder 6, piston 7, and steam chest 8 having, for example, an inside admission and an outside exhaust piston valve 10 with the exception that certain of the steam ports 9 at the head end are widened as indicated at 5 in Fig. 3, this widening being so disposed as to give an extra amount of port opening on the admission side of the port when the valve is at the normal cut-off position. These special compensating ports will be closed to admission slightly later than the time of the normal cut-off, which permits additional steam to be admitted to the cylinders beyond the normal cut-off and thereby increases the pressure during the expansion as shown by the indicator card in Figure 4. It will be noted that the time at which release and compression occur has not been changed as the exhaust edge of the compensating ports is in line with the normal ports, the change having been made on the admission side.

The extra port opening which I employ in these compensating ports is but a small proportion of the total port area of the cylinder and its effect is at the maximum when the engine is operating at very low speed and gradually decreases as the speed of the engine increases because when the engine is running at high speed, the compensating port will not be uncovered for a sufficient length of time to admit any appreciable amount of steam to the cylinder. The effect of the arrangement just described is to automatically bring the cut-off back to its normal position at high speed which is of economic advantage to the engine. On the other hand when the engine is starting and running at low speed it uses only a part of that steam which the boiler is capable of producing. When the engine is running at high speed, on the other hand, the maximum power of the engine is being developed as well as of the boiler and it is desirable, under such conditions, to expand the steam in the cylinders just as much as possible.

It follows from the above that a compensating cut-off of 60% would be a waste of steam if it was permitted to operate at the high speeds but as the arrangement described provides means whereby the cut-off automatically comes back to normal position at high speeds the benefits of this invention can be secured in starting and at low speeds and we can still obtain practically the same rate of steam consumption as we would get with the usual cut-off arrangement at the higher speeds.

The result of this automatic adjustment or change in the action of the compensating port is that the compensating cut-off principle will furnish additional tractive force with the engine starting and also when running at low speeds and without in any appreciable degree impairing the performance at the higher speeds. As it takes much more tractive force to start a train and to run it at slow speeds than it does to haul it at a higher speed, the result of this invention is to either permit a heavier load to be handled by the engine or else reduce the time which will be required to start and accelerate a train of the same tonnage when compared with the performance of an engine with usual port equipment.

Figs. 4 and 5 are included as being helpful to a clear understanding and appreciation of the invention. They illustrate the right hand side only of a locomotive, and show the driving wheels 11, crank 12 and main rod 13 connected in the usual manner to the piston 7 by the piston rod 14 and crosshead 15. The rear driving wheel to which the main rod is connected is marked to show the quarters beginning with the forward dead center, and, as is well known to those skilled in the art, the crank pin 16 has not quite reached a position 90° from the forward dead center when the piston 7 is in the center of its stroke, due to the angle which the main rod makes with the axis of the cylinder 6.

Therefore, as is well understood, even through the amount of work actually produced in each end of the cylinder is practically the same with the customary equal cut-off at both ends, yet the forces exerted at the rail will be different for the same position of the piston on the forward and backward strokes because of the angularity above described. This is shown by the solid line $3^a$ in Figure 1. It is, of course, impossible to eliminate the angularity of the main rod, but by deliberately unbalancing the forces acting on the two faces of the piston, as is done in my invention, the effect of the angularity is largely overcome.

Through the provision of my compensating ports I can carry the admission of steam to a point beyond the point of normal cut-off and thereby maintain full steam pressure on the head end until the crank pin, on its backward stroke, has reached a position which is equivalent to the position attained on the forward stroke at the point of normal cut-off. At the bottom quarter on the back stroke the crank pin must pass through the angle "A" before the 90° position is reached, and at the top quarter it has already passed through the angle "B" when the piston returns to its mid-position.

By my invention, as the crank pin passes through the bottom quarter after the point of normal cut-off, the piston is subjected to full stream pressure through the compensating ports while the crank pin is moving through a total angle equal to the sum of angles "A" and "B". Also, since more steam has been admitted to the head end of the cylinder, the pressure during expansion is greater as shown by the line 18 on the indicator card of Fig. 4 and for the remainder of the backward stroke, a greater turning force is produced at the wheel than would be the case without the compensating ports. The dotted line 17 in the card of Fig. 4 shows the pressure which would be obtained without the compensating ports, the length of extra admission through the compensating ports being indicated by the dimension lines and the arrowheads. The greater turning force thus made possible for those portions of the cycle where normally there would be less than the peak is shown by the dashes in the lines 1 and 2 of Fig. 1, and the extra tractive power thus developed increases the average tractive power of the locomotive as indicated in Fig. 1.

I claim:

1. In a limited cut-off locomotive, the combination of a valve chest, a valve, main portage of normal cut-off at the crank end, main portage of normal cut-off at the head end, an auxiliary starting port of later cut-off at each end, and supplementary main portage at the head end of later cut-off than the normal cut-off of said other main portage but earlier than that of said auxiliary ports whereby to raise the tractive power of the locomotive at the periods where it is normally reduced so that the average tractive power is greater, said supplementary portage being a small proportion only of the entire main portage at the head end whereby the effect of the supplementary portage is substantially overcome at high speeds.

2. In combination with the cylinders of a steam engine having valve means providing limited maximum main cut-off and auxiliary means providing later cut-off for starting, supplemental steam-admission means, at the head end only, of intermediate cut-off and of small capacity as compared to the main admission means.

In testimony whereof, I have hereunto signed my name.

ALBERT J. TOWNSEND.